US006970901B1

(12) United States Patent
Moritz

(10) Patent No.: US 6,970,901 B1
(45) Date of Patent: Nov. 29, 2005

(54) DEVICE AND METHOD FOR SWAPPING OUT A PART OF A SERVICE LOGIC PROGRAM

(75) Inventor: Peter Moritz, Haar (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/582,969

(22) PCT Filed: Dec. 15, 1998

(86) PCT No.: PCT/DE98/03679

§ 371 (c)(1),
(2), (4) Date: Jul. 7, 2000

(87) PCT Pub. No.: WO99/35858

PCT Pub. Date: Jul. 13, 1999

(30) Foreign Application Priority Data

Jan. 9, 1998 (DE) ................................. 198 00 644

(51) Int. Cl.[7] ............................................. G06F 15/16
(52) U.S. Cl. ..................... 709/200; 709/201; 709/229; 379/230
(58) Field of Search .............................. 709/202, 203, 709/206, 228, 227, 221, 200, 201, 229; 705/35; 379/230, 265.11

(56) References Cited

U.S. PATENT DOCUMENTS 5,815,665 A * 9/1998 Teper et al. ................. 709/229
5,841,854 A * 11/1998 Schumacher et al. ..... 379/265.11
5,995,610 A * 11/1999 Smidt et al. ............. 379/207.02
6,185,565 B1 * 2/2001 Meubus et al. ................ 707/10
6,246,758 B1 * 6/2001 Low et al. ................... 379/230
6,272,555 B1 * 8/2001 Gish ........................... 709/315
6,578,075 B1 * 6/2003 Nieminen et al. ........... 709/221

FOREIGN PATENT DOCUMENTS

| WO | WO 97/23988 | 7/1997 | |
|---|---|---|---|
| WO | WO 97/31492 | 8/1997 | |
| WO | WO 98/00951 | 1/1998 | |
| WO | WO-9800951 | * 1/1998 | ........... H04L 12/00 |

OTHER PUBLICATIONS

Low, Colin "The Internet Telephony Red Herring", Hewlett Packard, (1996), pp. 1-15, XP 002043669.
Low, Colin "Web IN An Architecture for Fast Deployment of IN-based Personal Services", Hewlett Packard, (1996), 6 pages, XP 002043670.
European Telecommunication Standard (EST) 300 196-1, Aug. 1993, pp. 3-7; 9-12; 56-60; 90-91.
International Telecommunication Union, (ITU-T) Q.1218, (1995), Table of Contents and pp. 1-14.

* cited by examiner

Primary Examiner—Wen-Tai Lin
(74) Attorney, Agent, or Firm—Morrison & Foerster LLP

(57) ABSTRACT

A method is defined with which various parts of a service logic are distributed onto different entities of a system and can collaborate and communicate with one another. An apparatus is specified with which a customer of an intelligent network can use a service at a provider, the service logic thereof running partly centrally at the service provider and partly relocated in, for example, the terminal equipment of the customer.

5 Claims, 1 Drawing Sheet

DEVICE AND METHOD FOR SWAPPING OUT A PART OF A SERVICE LOGIC PROGRAM

BACKGROUND OF THE INVENTION

Increased advances in the use of intelligent networks (IN) are occurring in the field of telecommunications. These advances have relied upon an architectural concept that, among other things, allows network operates to define and offer telecommunication services for their customers in a simple way. The architecture can be applied to many telecommunication networks such as, for example, PSTN or N-ISDN.

There are three critical function units in an intelligent network: call-handling functions (for example, call handling, the basic functions of telecommunication networks); service execution functions (for example, switching, resource control); and service management functions SMF (including development, offering, administering IN services).

One result of the SMF is the service logic program that can be loaded onto a service control point SCP and be implemented in the SCP. It is also possible to distribute this service logic onto a plurality of SCPs, wherein a complete copy of the service logic program is employed. The service logic program is implemented when a service call from a service user arrives at a switching center (service switching point SSP).

An important point in producing services in an intelligent network is charging for these services. Hence, the service logic generates a charge information (charging ticket), such as in the form TC_CONTINUE(FurnishChargingInformation, SendChargingInformation, Connect) (see Q.1218 with respect thereto), for example. These information are delivered to a central location (billing center) and processed there. The data contained therein are employed for charging the account of the customer or, in the case of "free phone", for instance, the account of the service subscriber or both accounts.

A special characteristic of this procedure is the possibility of also modifying the current charge rate during an existing connection, such as upon entry into a new rate time, discount given long calls or the like.

With the intensified introduction of computer telephony integration (CTI) and the continued development of distributed applications like Java, the services offered in the IN will also change in future. For this purpose, it will become necessary to install "more intelligent" devices at, for example, the ultimate consumer. In order to also completely exploit the additional possibilities of these devices, it will be necessary to expand the concept of the intelligent networks.

SUMMARY OF THE INVENTION

An object of the invention is to offer service providers and service users in a communications network a more flexible possibility of having the service logic needed for an offered service run.

This and other objects are achieved by a method with which various parts of a service logic can be distributed onto various entities of a system and can collaborate and communicate with one another at the various entities. An apparatus is specified with which a customer of an intelligent network can use a service at a provider, the service logic thereof running partly centrally at the service provider and partly relocated, for example, in the terminal equipment of the customer.

The definition and offering of new services becomes possible due to the division of the service logic into a centralized part and a decentralized part. For example, additional information about connections can be made available to the customer, these being capable of being furtherprocessed or interpreted in some other way. Momentarily existing media failures can be avoided. For instance, the customer searches a telephone number via his PC and immediately dials the desired number by pressing a button at the PC. Further usage possibilities of the connections for which a "more intelligent" terminal device is required can be opened up.

The division of the service logic thereby derives from the type of logic and the service realized according to the present invention. In most instances, it will be significant to place the relocated part of the service logic on the terminal equipment of the customer. It is also significant to use the connections (e.g., ISDN) that already exist between the central entity and the relocated part (i.e., the terminal equipment). The part of the service logic that is responsible for generating the charge information must be given special consideration.

Additional advantages and novel features of the invention will be set forth, in part, in the description that follows and, in part, will become apparent to those skilled in the art upon examination of the following or may be learned by practice of the invention. The advantages of the invention may be realized and attained by means of the instrumentalities and combinations particularly pointed out in the appended claims.

BRIEF DESCRIPTION OF THE DRAWINGS

Reference is made to the attached FIGURE. This FIGURE shows a structure with a part of an intelligent network according to an embodiment of the present invention.

DETAILED DESCRIPTION OF THE PREFERRED EMBODIMENTS

Figure 1:
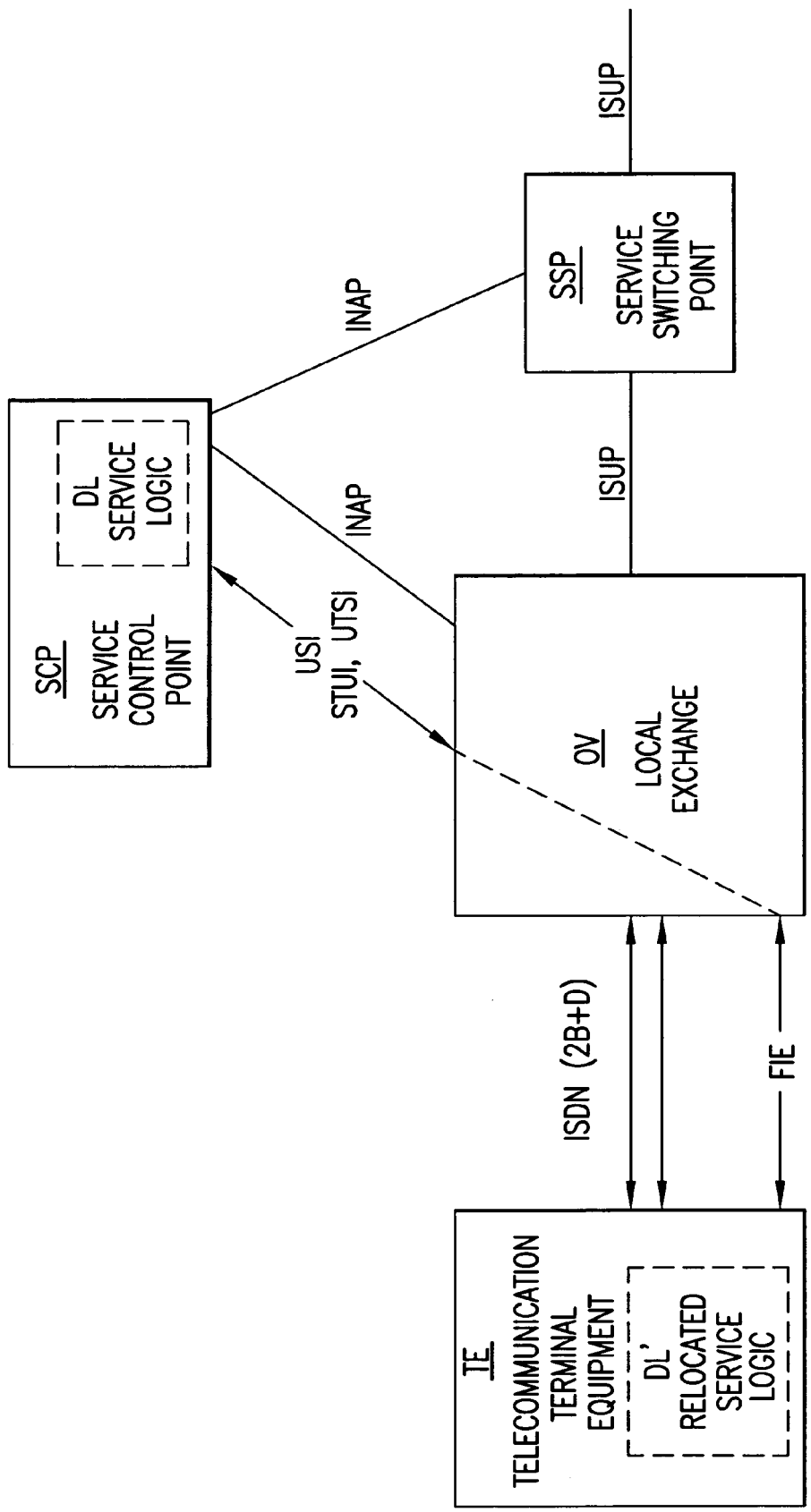

The FIGURE shows a schematic arrangement of the distribution of a service logic in an intelligent network IN and the communication between the parts of the service logic required therefor.

A central part of the service logic DL is located in a service control point SCP. The relocated part of the corresponding service logic DL' is located on the telecommunication terminal equipment TE of the service user in this example. The two parts of the service logic are connected to one another by a local exchange OV. The terminal equipment is thereby connected to the local exchange OV with an ISDN line. For example, the control signals are communicated on this connection with facility information elements FIE via the D-channel of the ISDN line. The local exchange OV is in turn connected to the service control point SCP on which the central part of the service logic runs. This connection occurs with the expanded INAP (intelligent network application protocol). At the other side, the service user is also connected via the local exchange to a switching node (service switching point SSP) of the intelligent network.

In this case, for the communication of the relocated part of the service logic DL' with the central part of the service logic DL can be implemented on the SCP with communication mechanisms that are already known and that must be somewhat expanded for this purpose.

The data communication connection between the relocated parts and the central part of the service logic must meet the following demands: the connection is automatically operational when the device that contains the relocated part is connected or turned on; high outage dependability and recovery capability after a connection outage; employment of the existing physical connections of the external device to the IN: parallel payload channels dare not be influenced. The service logic must thereby satisfy the following conditions: no manual interventions needed at the device for administration and operation; security assured, for instance by unambiguously assigned identities, whereby the existing numberings should be employable for the addressing; and suitable for a multitude of device types and interfaces.

What are referred to as facility information elements FIE can be employed in this case for the first part of the link that, for example, leads via an existing ISDN connection from the service user to the local exchange. The D-channel provided for signalling in ISDN can be employed as a connecting path. These FIE elements are already known from the ETS 300 196-1. The FIE elements assigned the job of functioning as containers for IN services. The content of these FIEs, normally referred to as "component", is "pre-"used in order to control what are referred to as supplementary services. The exact structure of the components is subject to the rules of BER and ASN.1. No expansion in the definitions of the FIE in the Standard is necessary.

User to service information (USI) signalling has already been designed for "call unrelated services" such as, for example, the short message service. This is composed of two parts: the service-to-user information (STUI) part and, in the opposite direction, the user-to-service information (UTSI) part.

Up to now, this signalling was not yet employed for the service control. As a result of an expansion of the USI method standardized in the INAP, the control of the service logic can be implemented here via the CCS7 network that already exists.

The following operations must be transferred from the norm Q.1218 (in a more recent generation, Q.1228, Capability Set CS-2 for intelligent networks) and must be adapted or, recreated.

| | | |
|---|---|---|
| ReportUTSI | (OV→SCF) | Reports UTSI information elements (like SSF-SCF interface) |
| RequestReportUTSI | (SCF→OV) | Requests the monitoring of UTSI elements (like SSF-SCF interface) |
| SendSTUI | (SCF→OV) | Requests an STUI information element at the SSF (like ITU-T Q.1228 SSF-SCF). |

In this solution, one is dependent on the existence of an ISDN connection to the terminal equipment. In order to assure a greater variety of terminal equipment and interfaces, a further possible realization composed of Java® technology is available. A programming interface, what is referred to as the Java® telephony application programming interface (JTAPI) is already prepared for this.

A description of JTAPI is found, for example, at http://java.sun.com/products/jtapi.

Applications in the telecommunications area can be realized in a simple way with the object-oriented development environment in the modular system. The JTAPI call model is composed of six different Java® objects that respectively represent a conceptual or physical entity in the telecommunication. Various hardware platforms and software interfaces are covered and a security mechanism is likewise already provided. (Java® is a trademark of Sun Microsystems.)

The charge information is again considerably separately below. It can be significant that a charge information ticket is not generated from the central entity but from the part of the service logic that is located in the relocated part of the service logic.

The transmission of the charge ticket is performed according to the same strategy that was already described in detail above. Transmission of the charge ticket includes the charging function in conformity with the contract between network operator, subscriber and customer.

It must be assured, however, that no fraudulent tickets proceed to the billing center, which then processes the tickets.

Falsifications can be prevented by traditional methods like the insertion of a signature. Another possibility of preventing fraudulent tickets is performed by checking all charge tickets with the central part of the service logic. Thus, the charge tickets of the relocated part of the service logic are viewed as "proposals" or "drafts" that can be accepted, modified or rejected by the central part of the service logic before they are forwarded for final processing to the billing center (the central entity that monitors and logs the charging of the service offering).

When the central part of the service logic receives such a charge ticket, it should review the plausibility of the requested charge. Insofar as this is assured, the ticket can be forwarded to the billing center with or without changes.

When the charge tickets received from the relocated entity are not correct or fail to arrive, the central part of the service logic must trigger a reaction. This can occur due to transmission errors or as a result of an explicit manipulation. Possible reactions are, for example, the immediate release of the connection, generating a "fraud ticket" or at least overwriting the incorrect ticket.

While this invention has been described in connection with what are presently considered to be the most practical and preferred embodiments, it is to be understood that the invention is not limited to the disclosed embodiment, but, on the contrary, is intended to cover various modifications and equivalent arrangements included within the spirit and scope of the appended claims.

What is claimed is:

1. A method for offering telecommunication service in an intelligent network comprised of a service logic, the method comprising:

implementing a first part of the service logic within a service control point; and implementing a second part of the service logic outside the service control point, wherein charge information is at least partly generated by the second part of the service logic, and wherein the second part of the service logic sends a proposal for the charge information to the first part of the service logic, which then further processes the charge information.

2. The method according to claim 1, wherein the first part of the service logic checks whether a charge proposal is acceptable when the charge proposal is sent by the second part of the service logic, and initiates review of the second part of the service logic when a result of this check is positive.

3. The method according to claim 1, wherein review of the second part of the service logic is initiated when the proposal for the charge information fails to arrive at the first part of the service logic.

4. The method according to claim 1, wherein the first part of the service logic checks whether a charge proposal is acceptable when the charge proposal is sent by the second part of the service logic, and forwards the charge proposal to an entity responsible for billing when a result of this check is positive.

5. A method for offering telecommunication service in an intelligent network comprised of a service logic, the method comprising:

implementing a first part of the service logic within a service control point; and implementing a second part of the service logic outside the service control point, wherein a first connection exists between the service control point and a local exchange using a first protocol, and a second connection exists between the local exchange and terminal equipment using a second protocol, wherein charge information is at least partly generated by the second part of the service logic, and wherein the second part of the service logic sends a proposal for the charge information to the first part of the service logic, which then further processes the charge information.

\* \* \* \* \*